United States Patent [19]
Tucker, Jr.

[11] 3,941,002
[45] Mar. 2, 1976

[54] POWERED TOOL BENCH

[76] Inventor: Joseph M. Tucker, Jr., 409 S. Walnut, Bunkie, La. 71322

[22] Filed: July 22, 1974

[21] Appl. No.: 490,412

[52] U.S. Cl. ................ 74/16; 144/1 G; 144/2 R; 248/13; 248/23
[51] Int. Cl.² ........................................ F16M 11/00
[58] Field of Search ............... 74/16; 144/1 G, 2 R; 248/23, 13

[56] References Cited
UNITED STATES PATENTS

| | | | |
|---|---|---|---|
| 2,196,891 | 4/1940 | Berndt | 248/23 |
| 2,463,134 | 3/1949 | Abbott | 74/16 |
| 2,522,960 | 9/1950 | Price | 74/16 |
| 2,599,170 | 6/1952 | Franks | 144/1 G X |
| 2,743,747 | 5/1956 | Franks | 144/1 G |
| 2,833,597 | 5/1958 | Sloyan | 248/23 X |
| 2,938,411 | 5/1960 | Herfurth | 74/16 |

Primary Examiner—Samuel Scott
Assistant Examiner—F. D. Shoemaker
Attorney, Agent, or Firm—Richards, Harris and Medlock

[57] ABSTRACT

A power tool bench for operating a variety of power and manual shop tools; the power tool bench comprising:
a. a bench;
b. a motor mounted on the bench;
c. slots positioned on the bench to slideably receive a tab positioned on one end of a tool to be mounted on the bench and an electromagnet positioned on the bench to maintain the other end of the tool in a desired position; and,
d. a torque transmitter operatively engaging the motor and the tool.

8 Claims, 3 Drawing Figures

POWERED TOOL BENCH

This invention is related to power and manual tools.

More particularly, this invention is related to electrically powered tools.

This invention is further related to a power bench which is suitable for the operation of a variety of interchangeably mountable electrical shop tools.

Heretofore, it has been desirable in home shops and the like to have various powered tools which are mounted on a work bench. Unfortunately, space limitations restrict the use of such bench mounted power tools in small shops such as home work shops and the like. Numerous methods for mounting such power tools are known; however, such methods require considerable space and a mounting area for each tool. As a result, it has been difficult to utilize a wide variety of bench mounted power tools in the limited space available in small shops, home work shops and the like.

Accordingly, much time and effort has been devoted to the problem of providing bench-mounted power tools which may be used in a confined space to perform a variety of functions.

It is an object of the present invention to provide a power bench which is useful with a variety of power and manual tools.

It is a further objection of the present invention to provide a power bench useful with a variety of interchangeably mounted power and manual tools which are quickly and easily exchanged for other tools.

It has now been found that the objectives of the present invention are achieved by the use of a power bench for operating a variety of power and manual shop tools, the power bench comprising: a bench means; a motor means mounted on the bench means; means for positioning a tool on the bench means comprising slot means positioned on the bench means to slideably receive tab means positioned on a first end of the tool and restraining means positioned on the bench means to maintain the second end of the tool in a desired position; and a means for transmitting torque from the motor means to the power tools.

The same numbers are used to refer to the same or similar elements throughout the description of the drawings.

Figure 1:
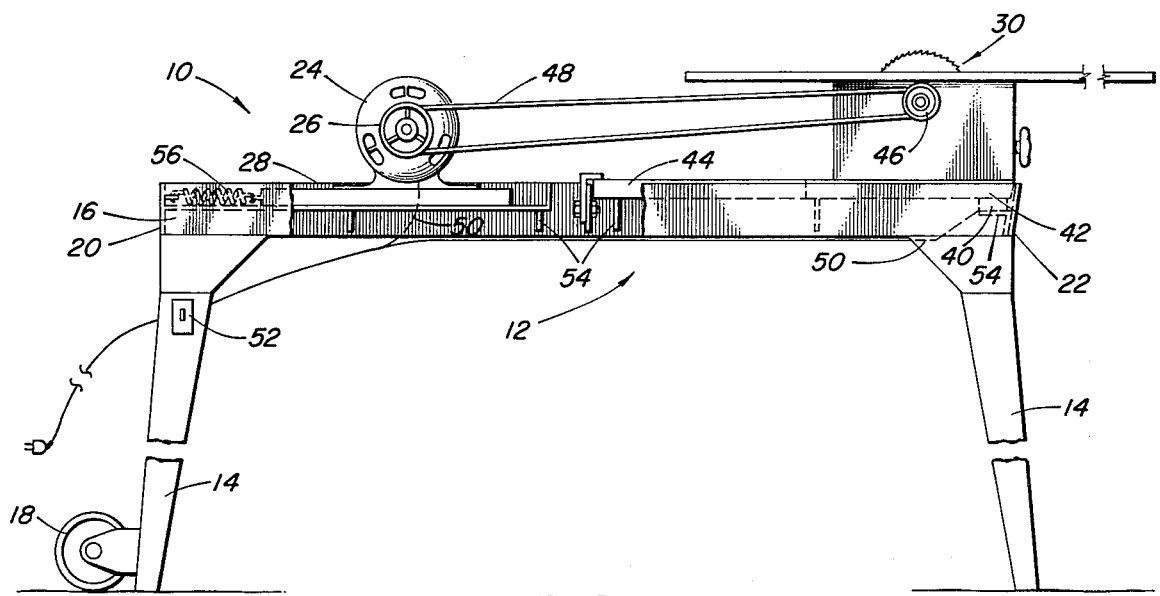
FIG. 1 is a side view of the power bench of the present invention.

In FIG. 1 the power bench 10 of the present invention is shown. Power bench 10 comprises a bench means 12 having a plurality of bench legs 14. The number of bench legs 14 is preferably three or four and in a desirable embodiment of the present invention a wheel means 18 is positioned on legs 14 at one end of power bench 10 so that upon lifting the other end of power bench 10 it is readily rolled about.

A motor means 24 is positioned on a first end 20 of power bench 10. Motor 24 is slideable mounted on a a slideable mount 28 and includes a motor pulley 26. A power tool 30 shown in FIG. 1 as a power saw is mounted on bench 10 by positioning tabs 38 in slot 32. Slots 32 as more particularly shown in FIG. 2 comprise a slot base 34 and a tab retainer 36. Tab 38 is slideable into slot 32 to retain power tool 30 in a desired position. An electromagnet means 40 is positioned at a second end 22 of power bench 10 immediately beneath a metal plate 42 which is positioned on a tool base 44. Mechanical restraining means are also suitable for use at second end 22 of power bench 10 either alone or in addition to electromagnetic means 40. Tool 30 is equipped with a pulley 46 and torque is transmitted from motor 24 to tool 30 by a belt 48. Electrical wiring 50 is provided to activate motor 24 and electromagnet 40. A switch 52 is provided and in a desired embodiment motor 24 and electromagnet 40 are activated simultaneously. In this embodiment, power tool 30 is retained in position by tab 38 and the force applied to metal plate 42 by electromagnet 40.

Figure 2:
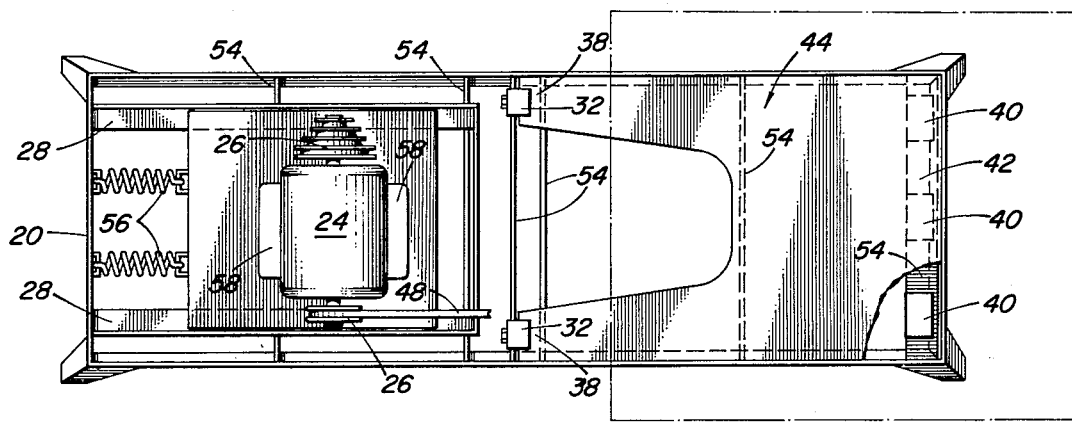
FIG. 2 is a top view of the power bench of the present invention showing a tool base in position.
Figure 3:
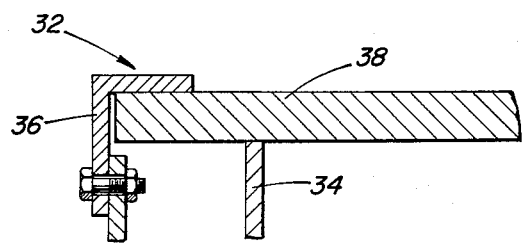
FIG. 3 shows the slot means and tab means more particularly.

FIG. 3 is a top view of power bench 10 showing a tool base 44 in place with no tool attached. It is readily apparent to those skilled in the art that a wide variety of power or manual tools can be mounted on such a power tool base. More particularly, in FIG. 3 motor means 24 is shown as slideably mounted on a motor base 58 which rests on slideable mounts 28. Motor 24 is connected to springs 56 which resiliently urge motor 24 toward first end 20 of power bench 10. It is readily seen that when motor 24 is engaged by belt 48 as shown in FIG. 1, with power tool 30 that springs 56 urge motor 24 toward first end 20 of power bench 10 and maintain an adequate tension on belt 48 to secure an effective transmission of torque to power tool 30. Motor 24 also desirably has two pulleys 26 positioned one at either end in order to provide a more versatile means for the transmission of torque to various types of tools. Pulleys 26 desirably include at least one and preferably a plurality of effective pitch diameters which may be coded by color or other suitable means to conveniently indicate the correct pitch to properly drive a selected power tool. In FIG. 2 electromagnet 40 is shown as a plurality of electromagnets. It is well recognized by those skilled in the art that an arrangement of multiple electromagnets, one larger electromagnet and the like are suitable. It is equally obvious to those skilled in the art that metal plate 42 must be of a metal such as iron, cobalt and the like which is magnetic. It will further be noted as shown in FIG. 3 that various support members 54 and the like are desirably positioned on bench top 16.

In FIG. 3 slots 32 are shown to be two in number and positioned on opposite sides of bench top 16. It will be obvious to those skilled in the art that slots 32 may take the form of a single slot extending the entire width of power bench top 16 and the like. The configuration of slot 32 and tab 38 is optional so long as a slideable connection which retains power tool base 44 in a desired position is achieved. Likewise, variations in the configuration of metal plate 42 and electromagnets 40 are possible within the scope of the present invention.

As is obvious to those skilled in the art many types of tools can be mounted on the power bench described above such as but not limited to planes, jigsaws, drills, power saws, sanders, lathes, grinders, metal saws, punches, arbor presses, shears, and the like. Such tools may be power or manual tools. No particular novelty is claimed in the particular tools used in conjunction with the power bench of the present invention aside from the use of such tools in conjunction with the powered bench as mounted and driven thereon.

Power bench 10 is constructed of suitable materials for the construction of shop equipment such as metal, wood, plastics and the like. It is anticipated that many variations and modifications in the nature of the construction materials will be considered obvious or desirable to those skilled in the art. It is necessary that power bench 10 be constructed of sturdy materials in order to provide durable shop equipment, and many of the components will need to be constructed of materials such as steel, stainless steel, cast aluminum, magnesium, reinforced plastic and the like. Such variations in the materials are well known to those skilled in the art and need not be discussed further.

Slideably mounted motor 24 may be positioned by merely sliding it into position and fastening it in position to maintain a desired tension on belt 48 or motor 24 may be mounted as shown in FIG. 3 wherein spring means 56 are positioned to urge motor 24 toward first end 20 of power bench 10 to maintain a desired tension on belt 48. Such mounting of motor 24 has a double advantage in that first a reliable resiliant tension is maintained and secondly, the motor may be manually moved to remove belt 48 if desired. Such is one method by which motor 24 may be disengaged from power tool 30.

In the use of power bench 10 of the present invention, tools 30 may be quickly and easily changed by merely disengaging electromagnet 40, lifting the end of power tool 30 having metal plate 42 positioned thereon, removing belt 48 and sliding tabs 38 out of slots 32 to remove the power tool 30. A second power tool 30 may be mounted on power bench 10 in a similar manner and in a desired embodiment as shown above electromagnet 40 is activated by the same switch which activates electric motor 24. In such an embodiment electromagnet 40 holds power tool 30 in a desired position during operation of motor 24. Of course, electromagnet 40 and motor 24 may be connected to different electrical connections and may have separate power sources. Interlocks may be conveniently placed in the electric circuit to permit operation of motor means 24 only when a power operated tool 30 is in proper position while permitting activation of electromagnet 40 to retain a manually operated tool in a desired position. Such variations are obvious to those skilled in the art and need not be discussed further.

Having thus described the invention, it is pointed out that many variations and modifications are possible within the scope of the present invention and it is anticipated that many such variations and modifications may appear obvious or desirable to those skilled in the art upon a review of the foregoing description of preferred embodiments.

Having thus described the invention, I claim:

1. A power bench for operating a variety of power and manual shop tools comprising:
   a. a bench means having a first and a second end;
   b. a motor means mounted on said bench means;
   c. means for positioning a tool on said bench means, said means comprising slot means positioned on said bench means to slideably receive tab means positioned on a first end of said tool and restraining means positioned on said bench means to maintain a second end of said power tool in a desired position said restraining means comprising an electromagnet means positioned on said bench means to magnetically engage a metal plate means positioned on said second end of said power tool; and
   d. means for transmitting torque from said motor means to said power tool.

2. The power bench of claim 1 wherein said motor means is slideably mounted on said bench means and is equipped with at least one pulley means having at least one effective pitch diameter, said power tool is equipped with at least one pulley means and said means for transmitting torque comprises a belt means joining said pulley means on said motor means and said pulley means on said power tool.

3. The power bench of claim 2 wherein means are provided for resiliantly urging said slideably mounted motor means toward said first end of said bench means, thereby maintaining a desired tension on said belt means.

4. The power bench of claim 3 wherein said power tool includes a base means said base means including said tab means and said metal plate means.

5. The power bench of claim 3 wherein said slot means are positioned between said first end of said bench means and said second end of said bench means and wherein said electromagnetic means is positioned near said second end of said bench means.

6. The power bench of claim 5 wherein said motor means and said electromagnetic means are activated by a common switch so that said power tool is retained in a desired position during operation, but readily removed when deactivated.

7. The power bench of claim 5 wherein said slot means comprises two slots positioned on opposite sides of said bench means.

8. The power bench of claim 5 wherein said slot means comprises a single slot extending substantially across the width of said bench means.

* * * * *